(12) United States Patent
Kadoda et al.

(10) Patent No.: US 9,940,335 B2
(45) Date of Patent: Apr. 10, 2018

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventors: Akira Kadoda, Kanagawa (JP); Yusuke Morita, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 432 days.

(21) Appl. No.: 14/607,319

(22) Filed: Jan. 28, 2015

(65) Prior Publication Data
US 2015/0213039 A1    Jul. 30, 2015

(30) Foreign Application Priority Data

Jan. 29, 2014 (JP) ................................ 2014-014220

(51) Int. Cl.
*G06F 17/30* (2006.01)

(52) U.S. Cl.
CPC .............................. *G06F 17/30126* (2013.01)

(58) Field of Classification Search
CPC .............................................. G06F 17/30126
USPC ........................................................ 707/822
See application file for complete search history.

(56) References Cited

U.S. PATENT DOCUMENTS

| | | | | |
|---|---|---|---|---|
| 6,393,429 B1 * | 5/2002 | Yagi | ....................... | G06F 3/0481 707/795 |
| 8,095,558 B2 * | 1/2012 | Barley | .............. | G06F 17/30982 707/791 |
| 9,455,939 B2 * | 9/2016 | Meisels | .................... | H04L 51/08 |
| 2002/0059288 A1 * | 5/2002 | Yagi | ....................... | G06F 3/0481 707/E17.01 |
| 2007/0136235 A1 * | 6/2007 | Hess | .................. | G06F 17/30997 707/E17.143 |
| 2009/0157740 A1 * | 6/2009 | Barley | .............. | G06F 17/30982 707/E17.009 |
| 2012/0278406 A1 * | 11/2012 | Meisels | .................... | H04L 51/08 709/206 |
| 2017/0012910 A1 * | 1/2017 | Meisels | .................... | H04L 51/08 |

FOREIGN PATENT DOCUMENTS

| | | |
|---|---|---|
| JP | 10-11458 A | 1/1998 |
| JP | 2000-56885 A | 2/2000 |
| JP | 2006-514377 A | 4/2006 |
| JP | 2009-38538 A | 2/2009 |
| WO | 2004/097682 A1 | 11/2004 |

* cited by examiner

Primary Examiner — Phong H Nguyen
(74) Attorney, Agent, or Firm — Sughrue Mion, PLLC (57) ABSTRACT

An information processing apparatus includes a recording unit, a log display unit, a selection unit, and a storage location data display unit. The recording unit records log entries regarding pieces of data selected by a user as targets of an information process in an information log. The log display unit displays storage locations of the pieces of data and a log list that is a list of the log entries recorded in the information log. The selection unit selects any of the storage locations of the pieces of data displayed. The storage location data display unit displays a storage location data list that is a list of pieces of data stored in the selected storage location.

10 Claims, 8 Drawing Sheets

| OPERATION DATE AND TIME | FILE/ FOLDER | OPERATION | NAME |
|---|---|---|---|
| 11/19/2013 hh:mm:ss | FOLDER | COPY | FOLDER E |
| 11/19/2013 hh:mm:ss | FOLDER | MOVE | FOLDER F |
| 11/19/2013 hh:mm:ss | FILE | COPY | FILE G |
| 11/19/2013 hh:mm:ss | FILE | MOVE | FILE H |
| 11/18/2013 hh:mm:ss | FILE | MOVE | FILE I |

| PRE-OPERATION PATH | POST-OPERATION PATH |
|---|---|
| xxx/ZZ/SOURCE FOLDER E/FOLDER E | xxx/ZZ/DESTINATION FOLDER E/FOLDER E |
| xxx/ZZ/SOURCE FOLDER F/FOLDER F | xxx/ZZ/DESTINATION FOLDER F/FOLDER F |
| xxx/ZZ/SOURCE FOLDER G/FILE G | xxx/ZZ/DESTINATION FOLDER G/FILE G |
| xxx/ZZ/SOURCE FOLDER H/FILE H | xxx/ZZ/DESTINATION FOLDER H/FILE H |
| xxx/ZZ/SOURCE FOLDER I/FILE I | xxx/ZZ/DESTINATION FOLDER I/FILE I |

| ACCESS DATE AND TIME/ BROWSE DATE AND TIME | FILE/ FOLDER | FILE NAME/ FOLDER NAME | FILE PATH/ FOLDER PATH |
|---|---|---|---|
| 11/19/2013 hh:mm:ss | FOLDER | FOLDER A | xxx/YY/FOLDER A |
| 11/19/2013 hh:mm:ss | FILE | FILE A | xxx/YY/FOLDER A/FILE A |
| 11/19/2013 hh:mm:ss | FOLDER | FOLDER B | xxx/YY/FOLDER B |
| 11/19/2013 hh:mm:ss | FILE | FILE B | xxx/YY/FOLDER B/FILE B |
| 11/19/2013 hh:mm:ss | FOLDER | FOLDER C | xxx/ZZ/FOLDER C |
| 11/18/2013 hh:mm:ss | FOLDER | FOLDER C | xxx/ZZ/FOLDER C |
| 11/18/2013 hh:mm:ss | FOLDER | FOLDER D | xxx/ZZ/FOLDER D |
| 11/18/2013 hh:mm:ss | FILE | FILE D | xxx/ZZ/FOLDER D/FILE D |
| 11/17/2013 hh:mm:ss | FOLDER | FOLDER A | xxx/YY/FOLDER A |
| | | | |

| OPERATION DATE AND TIME | FILE/FOLDER | OPERATION | NAME |
|---|---|---|---|
| 11/19/2013 hh:mm:ss | FOLDER | COPY | FOLDER E |
| 11/19/2013 hh:mm:ss | FOLDER | MOVE | FOLDER F |
| 11/19/2013 hh:mm:ss | FILE | COPY | FILE G |
| 11/19/2013 hh:mm:ss | FILE | MOVE | FILE H |
| 11/18/2013 hh:mm:ss | FILE | MOVE | FILE I |
| | | | |

| PRE-OPERATION PATH | POST-OPERATION PATH |
|---|---|
| xxx/ZZ/SOURCE FOLDER E/FOLDER E | xxx/ZZ/DESTINATION FOLDER E/FOLDER E |
| xxx/ZZ/SOURCE FOLDER F/FOLDER F | xxx/ZZ/DESTINATION FOLDER F/FOLDER F |
| xxx/ZZ/SOURCE FOLDER G/FILE G | xxx/ZZ/DESTINATION FOLDER G/FILE G |
| xxx/ZZ/SOURCE FOLDER H/FILE H | xxx/ZZ/DESTINATION FOLDER H/FILE H |
| xxx/ZZ/SOURCE FOLDER I/FILE I | xxx/ZZ/DESTINATION FOLDER I/FILE I |
| | |

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-014220 filed Jan. 29, 2014.

BACKGROUND

Technical Field

The present invention relates to an information processing apparatus, an information processing system, an information processing method, and a non-transitory computer readable medium.

SUMMARY

According to an aspect of the invention, there is provided an information processing apparatus including a recording unit, a log display unit, a selection unit, and a storage location data display unit. The recording unit records log entries regarding pieces of data selected by a user as targets of an information process in an information log. The log display unit displays storage locations of the pieces of data and a log list that is a list of the log entries recorded in the information log. The selection unit selects any of the storage locations of the pieces of data displayed. The storage location data display unit displays a storage location data list that is a list of pieces of data stored in the selected storage location.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described. Note that an element in each figure attached hereto, which is similar to an element in a figure preciously described, is given the same reference numeral, and detailed description thereof may be omitted as appropriate.

First Exemplary Embodiment

Figure 1:
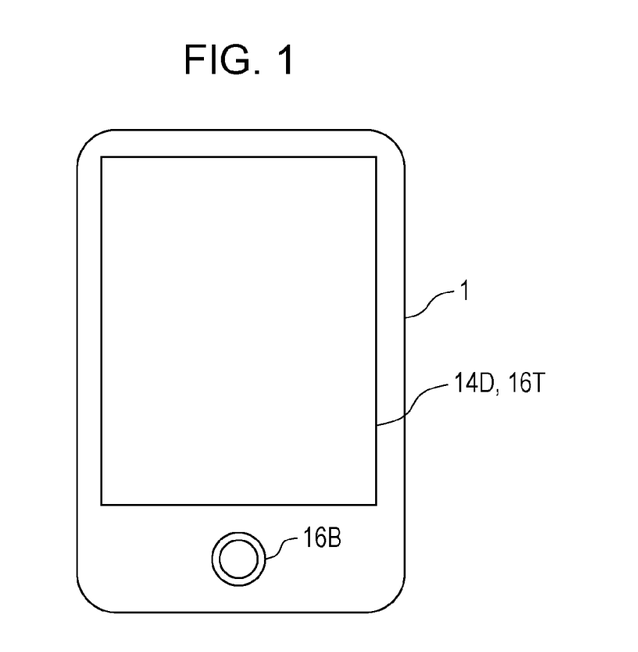
FIG. 1 is a diagram illustrating an external appearance of an information processing apparatus according to exemplary embodiments.

FIG. 1 is a diagram illustrating an external appearance of an information processing apparatus according to the exemplary embodiments. An information processing apparatus 1 is a terminal apparatus used by a user and is a portable phone, such as a smartphone, a tablet computer, or a laptop computer, for example. In the exemplary embodiments, description will be given while assuming that the information processing apparatus 1 is a smartphone.

Figure 2:
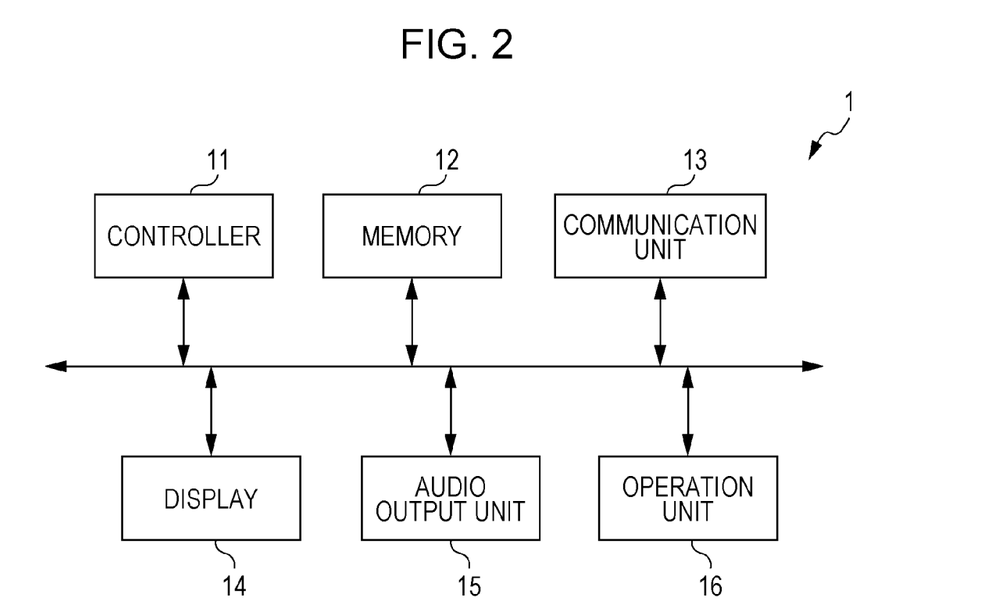
FIG. 2 is a diagram illustrating a hardware configuration of the information processing apparatus.

FIG. 2 is a diagram illustrating a hardware configuration of the information processing apparatus 1. The information processing apparatus 1 includes a controller 11, a memory 12, a communication unit 13, a display 14, an audio output unit 15, and an operation unit 16.

The controller 11 is constituted by a microprocessor and the like, for example. The controller 11 operates in accordance with an operation system and a program stored in the memory 12, performs various arithmetic processes, and controls each unit in the information processing apparatus 1. Note that the program may be provided over a network in which data communication is possible, or may be stored in a computer readable storage medium, such as a flash memory, and provided from the storage medium.

The memory 12 is constituted by a memory device, such as a random access memory (RAM) or a flash memory, a hard disk drive, and the like, for example. The memory 12 stores a program, data, and information and operation results input from each unit in the information processing apparatus 1.

The communication unit 13 is constituted by an integrated circuit, an antenna, and the like for a wireless local area network (LAN), for example. The communication unit 13 performs data exchange with other apparatuses over a network in which data communication is possible, such as a computer communication network or a portable phone network.

The display 14 is a liquid crystal display or an organic electroluminescence (EL) display, for example, and includes a display 14D (see FIG. 1) provided on the surface of the information processing apparatus 1. The display 14 displays a screen in accordance with an instruction given by the controller 11.

The audio output unit 15 is a speaker or a headphone, for example, and outputs sound in accordance with an instruction given by the controller 11.

The operation unit 16 is used for a user to perform operations. The operation unit 16 is constituted by input devices, such as a button and a touch panel, for example, and includes a button 16B provided on the surface of the information processing apparatus 1 and a touch panel 16T stacked on the display 14D (see FIG. 1). Here, the touch panel 16T is a typical touch panel that detects a position at which a user touches the touch panel 16T as a position in a display screen displayed on the display 14D.

Figure 3:
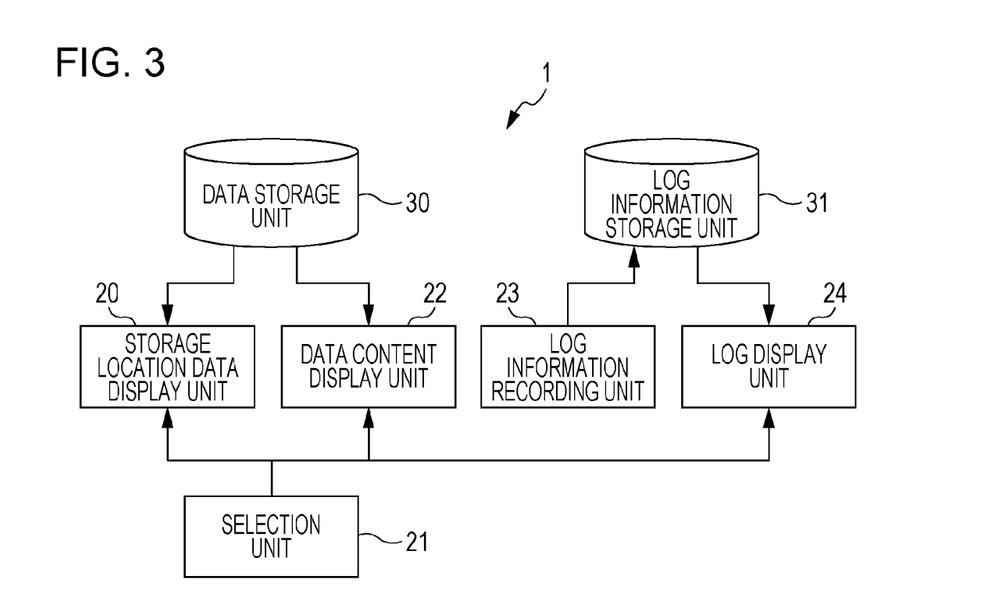
FIG. 3 is a functional block diagram illustrating a functional configuration of the information processing apparatus.

FIG. 3 is a functional block diagram illustrating a functional configuration of the information processing apparatus 1. As illustrated in FIG. 3, the information processing apparatus 1 includes a storage location data display unit 20, a selection unit 21, a data content display unit 22, a log information recording unit 23, and a log display unit 24 as functional units. The functions may be implemented by the controller 11 executing the operating system and the program stored in the memory 12, thereby controlling the display 14 and the operation unit 16. The information processing apparatus 1 further includes a data storage unit 30 and a log information storage unit 31 as functional units. The functions may be implemented by the memory 12 and the like storing information relating to each unit.

The data storage unit 30 is implemented as the memory 12 and the like. The data storage unit 30 includes storage locations for storing one or plural pieces of data. Note that data described here is not limited to data of a specific type or format and may include document data, image data, audio data, moving image data, and the like. The data storage unit 30 may be managed as a file system provided by the operating system. It is assumed in the exemplary embodiments that, in the data storage unit 30, plural storage locations (hereinafter also referred to as folders) for storing plural pieces of data (hereinafter also referred to as files) are configured in a hierarchical structure.

The storage location data display unit 20 is implemented as the controller 11, the display 14, and the like. The storage location data display unit 20 displays a storage location data list that is a list of pieces of data stored in a selected storage location. Note that the storage location data list described here may include a storage location immediately below the selected storage location (a subfolder) in addition to the pieces of data stored in the selected storage location. The storage location data display unit 20 displays a display screen that includes a list of files and folders stored in a specific folder on the display 14D provided on the surface of the information processing apparatus 1, for example.

Figure 4:
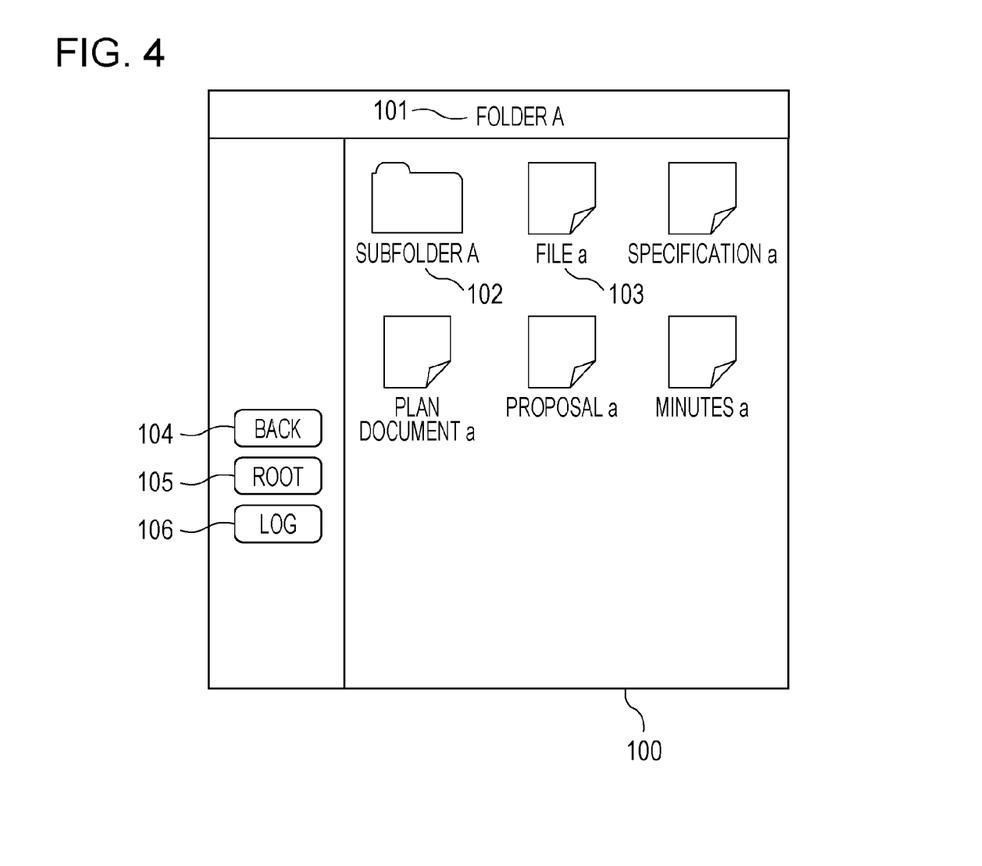
FIG. 4 is a diagram illustrating a display screen on which a storage location data list is displayed.

FIG. 4 is a diagram illustrating a display screen on which the storage location data list is displayed. As illustrated in FIG. 4, on a display screen 100, a title 101, a folder image 102, a file image 103, a back button 104, a root button 105, and a log button 106 are arranged. As the title 101, a folder name or information indicating the location of a folder in the hierarchical structure (for example, a folder path or a character string, such as "root", which means the topmost folder) is displayed. The folder image 102, the file image 103, the back button 104, the root button 105, and the log button 106 are arranged so as to be selectable by a user.

The selection unit 21 is implemented as the controller 11, the operation unit 16, and the like. The selection unit 21 selects any element from among the elements arranged on the display screen 100, on the basis of a position in the display screen 100 specified by a user and detected by the operation unit 16. For example, a user gives an instruction for executing a function associated with an image or a button by touching the image or the button displayed on the display screen 100 with his/her finger or the like.

The storage location data display unit 20 updates the content displayed on the display screen 100 in accordance with the result of selection made by the selection unit 21. Specifically, in a case where the folder image 102 has been selected by a user, the storage location data display unit 20 displays the storage location data list corresponding to the selected folder instead of the content currently displayed on the display screen 100.

In a case where the file image 103 has been selected by a user as a target of an information process, an information process determined in advance in accordance with the type of the selected file is performed. In a case where the selected file is a document file, for example, an application program for document browsing is activated, and the document file is displayed on the display screen 100 so as to be browsable. In a case where the selected file is an audio file or a moving image file, for example, an application program associated with the file is activated, and the sound or the moving image is reproduced. Hereinafter, a state where an information process is performed in accordance with the file type will also be described as a state where the file is accessed.

Note that, in a case where the file image 103 has been selected by a user, an image that represents the content of the selected file (hereinafter also referred to as a preview image) may be displayed instead of an application program being executed as described above. Here, the data content display unit 22 displays an image that represents the content of data selected by the selection unit 21. Note that the data content display unit 22 is implemented as the controller 11, the display 14, and the like.

Figure 5:
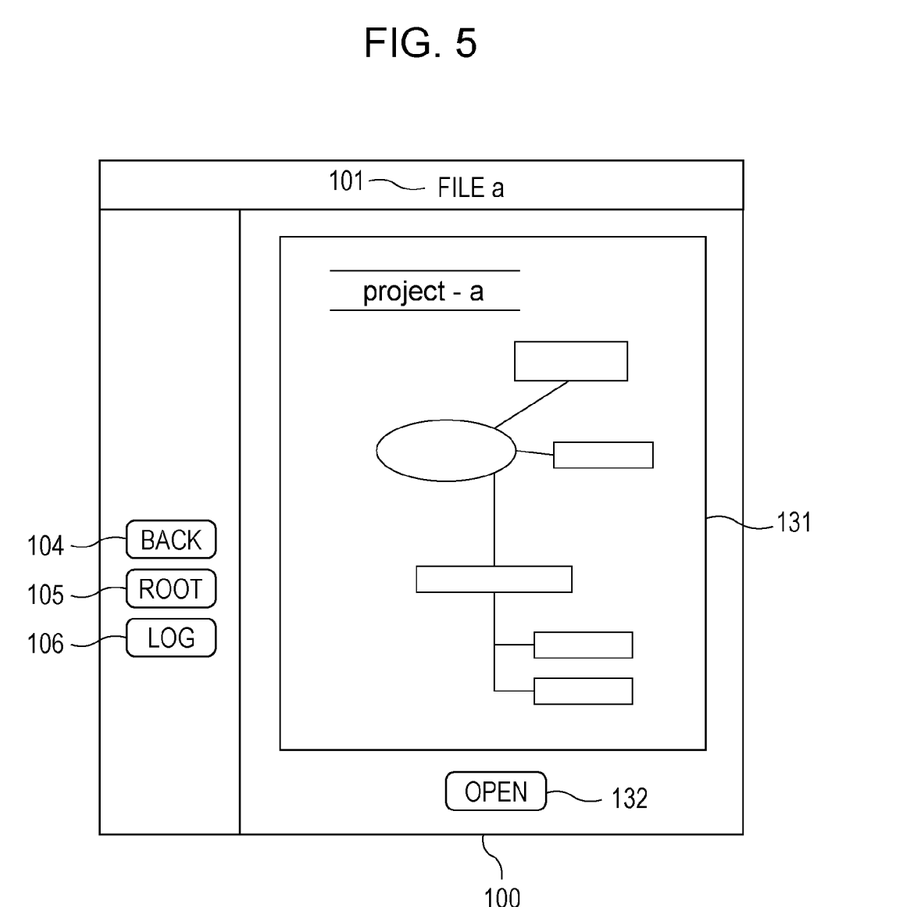
FIG. 5 is a diagram illustrating the display screen on which a preview image is displayed.

FIG. 5 is a diagram illustrating the display screen 100 on which a preview image is displayed. As illustrated in FIG. 5, on the display screen 100 in this example, the title 101 that indicates the name of the selected file and a preview image 131 that represents the content of the selected file are displayed. On the display screen 100 in this example, an open button 132 is arranged so as to be selectable. Here, in a case where the open button 132 has been selected by a user, an application program is executed, and the file corresponding to the displayed preview image 131 is accessed.

On the display screen 100 illustrated in FIG. 5 on which the preview image 131 is displayed, the back button 104, the root button 105, and the log button 106 are arranged so as to be selectable similarly to the display screen 100 illustrated in FIG. 4 on which the storage location data list is displayed. Here, in a case where the back button 104 has been selected by a user, the display screen 100 is updated to display the content displayed immediately before the current content is displayed. In a case where the root button 105 has been selected by a user, the storage location data list that is a list of files and folders stored in the root folder, which is the topmost folder in the hierarchical structure, is displayed. In a case where the log button 106 has been selected by a user, a log list is displayed on the display screen 100. The log list will be described in detail below.

The log information recording unit 23 is implemented as the controller 11 and the like. The log information recording unit 23 records a log entry regarding data selected by a user as a target of an information process in an information log. Here, data selected by a user as a target of an information process is a file which has been selected by the selection unit 21 from among the files displayed in the storage location data list and on which a predetermined information process has been performed in accordance with an application program. The log information recording unit 23 monitors whether or not a file is accessed and, if a file is accessed, records a log entry regarding the file in the information log.

The log information recording unit 23 records a log entry regarding a storage location browsed by a user in the information log. Here, a storage location browsed by a user is a storage location corresponding to the storage location data list that is a list of files and folders displayed by the storage location data display unit 20. In a case where the storage location data list illustrated in FIG. 4 is displayed, for example, the log information recording unit 23 records "Folder A" in the information log as a storage location log entry.

Note that the log information recording unit 23 may record a storage location for which the storage location data list has been displayed for a predetermined time period in the information log. Specifically, the log information recording unit 23 may measure a time period during which the storage location data list has been displayed on the display screen 100 and, in a case where the time period exceeds the predetermined time period, may record a log entry regarding a folder corresponding to the displayed storage location data list in the information log. Note that the log information recording unit 23 may measure a time period during which the storage location data list has been continuously displayed or may measure the sum of time periods in a specific period (for example, the sum of time periods in a day) during which the storage location data list has been displayed.

Figure 6:
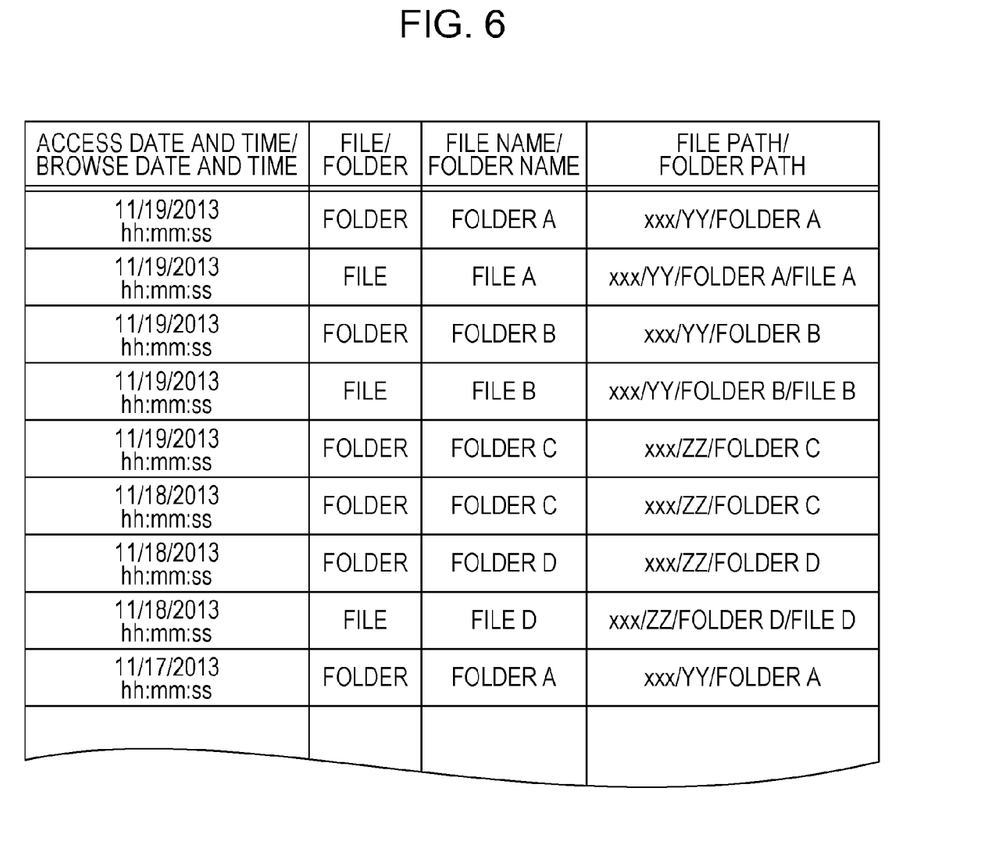
FIG. 6 is a diagram illustrating an information log according to a first exemplary embodiment.

FIG. 6 is a diagram illustrating the information log according to the first exemplary embodiment. As illustrated in FIG. 6, the information log includes the date and time of access to each file by a user or the date and time of browsing of each folder by a user, information used to categorize each log entry as a file log entry or a folder log entry, information regarding the name of each file or folder, and the file path or the folder path of each file or folder. In a case where a file has been accessed by a user, the log information recording unit 23 stores the information log including a log entry regarding the file, the log entry including the date and time of access to the file, the file name, and the file path, in the log information storage unit 31. In a case where a folder has been browsed by a user, the log information recording unit 23 stores the information log including a log entry regarding the folder, the log entry including the date and time of browsing of the folder, the folder name, and the folder path, in the log information storage unit 31.

The log display unit 24 is implemented as the controller 11, the display 14, and the like. The log display unit 24 displays the log list that is a list of log entries recorded in the information log. Specifically, the log display unit 24 refers to the information log stored in the log information storage unit 31 and displays a list of log entries regarding files and folders recorded in the information log.

Figure 7:
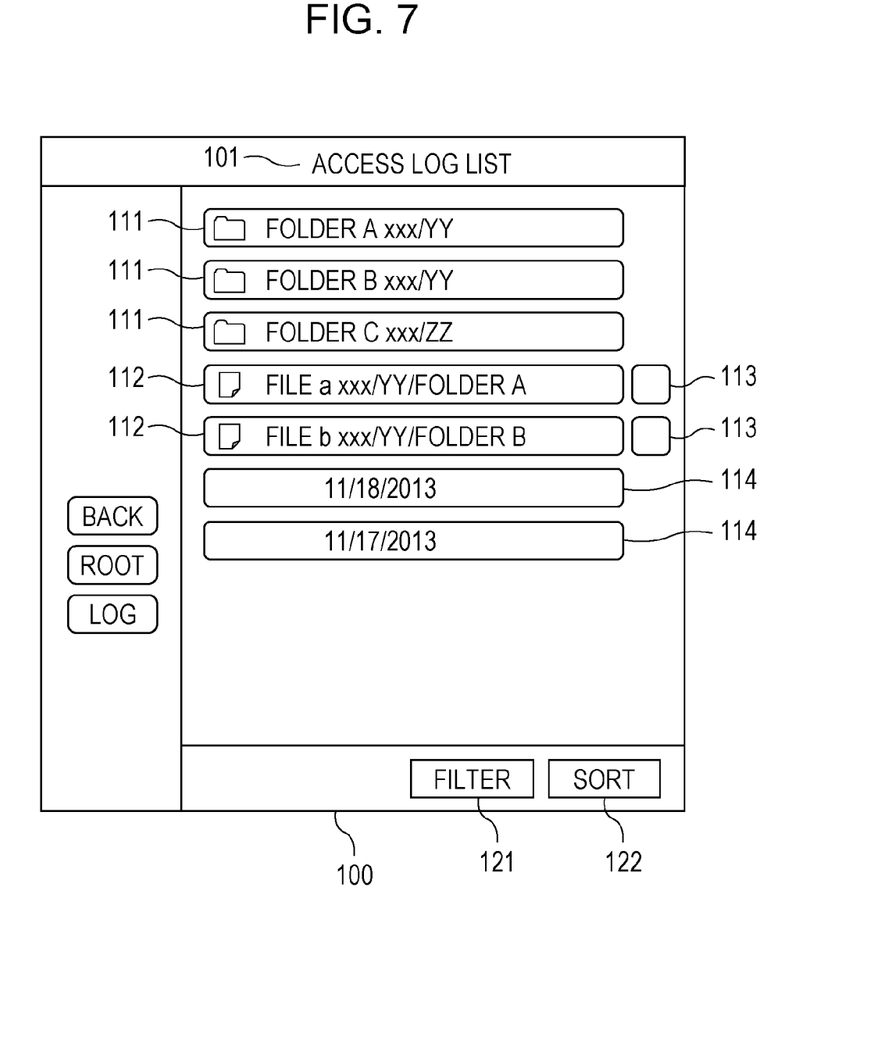
FIG. 7 is a diagram illustrating the display screen on which a log list according to the first exemplary embodiment is displayed.

FIG. 7 is a diagram illustrating the display screen 100 on which the log list according to the first exemplary embodiment is displayed. As illustrated in FIG. 7, on the display screen 100 in this example, folder selection buttons 111, file selection buttons 112, file storage location selection buttons 113, date buttons 114, a filter button 121, and a sort button 122 are arranged so as to be selectable. Note that the log list according to the first exemplary embodiment will also be referred to as an access log list hereinafter.

In a case where a log entry regarding a folder has been recorded in the information log, the log display unit 24 arranges the folder selection button 111 corresponding to the folder on the display screen 100. The folder selection button 111 displays the folder name and the folder path recorded in the information log, an image indicating that the log entry is a folder log entry, and the like.

The selection unit 21 selects any one from among the storage locations displayed in the log list, and the storage location data display unit 20 displays the storage location data list that is a list of pieces of data stored in the selected storage location. Specifically, in a case where the folder selection button 111 has been selected by a user, the storage location data list that is a list of files and folders stored in the selected folder is displayed on the display screen 100. In a case where the folder selection button 111 corresponding to "Folder A" has been selected from among the folder selection buttons 111 illustrated in FIG. 7, for example, the storage location data list corresponding to "Folder A" is displayed on the display screen 100 (see FIG. 4).

In a case where a log entry regarding a file has been recorded in the information log, the log display unit 24 arranges the file selection button 112 and the file storage location selection button 113 corresponding to the file on the display screen 100. The file selection button 112 displays the file name and the storage location of the file recorded in the information log, an image indicating that the log entry is a file log entry, and the like. Note that the storage location of a file is a storage location in which the file is directly stored without being stored in a storage location that is within the storage location of the file. The log display unit 24 may identify the folder path of the folder that is the storage location of the file by extracting a character string from the first character to the last "/" from the character string that represents the file path in the information log.

The selection unit 21 selects any one from among the pieces of data displayed in the log list, and the data content display unit 22 displays an image that represents the content of the selected piece of data. Specifically, in a case where the file selection button 112 has been selected by a user, the preview image 131 that represents the content of the selected file is displayed on the display screen 100. In a case where the file selection button 112 corresponding to "File a" has been selected from among the file selection buttons 112 illustrated in FIG. 7, for example, the preview image 131 of "File a" is displayed on the display screen 100 (see FIG. 5).

The selection unit 21 selects the storage location of any of the pieces of data displayed in the log list, and the storage location data display unit 20 displays the storage location data list that is a list of pieces of data stored in the selected storage location. Specifically, in a case where the file storage location selection button 113 has been selected by a user, the storage location data list that is a list of files and folders stored in the selected folder is displayed on the display screen 100. In a case where the file storage location selection button 113 corresponding to "File a" has been selected from among the file storage location selection buttons 113 illustrated in FIG. 7, for example, the storage location data list corresponding to "Folder A" is displayed (see FIG. 4).

In a case where a record in which the date and time of access on a day before the current date or the date and time of browsing on a day before the current date has been recorded is present in the information log, the log display unit 24 displays the date button 114 instead of displaying the folder selection button 111 or the file selection button 112 corresponding to the log entry. For example, it is assumed that the log display unit 24 refers to the information log illustrated in FIG. 6 and that the current date is Nov. 19, 2013. In this case, the date buttons 114 corresponding to dates Nov. 18, 2013 and Nov. 17, 2013 are displayed because records, in each of which the date and time of access (or the date and time of browsing) on Nov. 18, 2013 or Nov. 17, 2013 has been recorded, are present in the information log.

Figure 8:
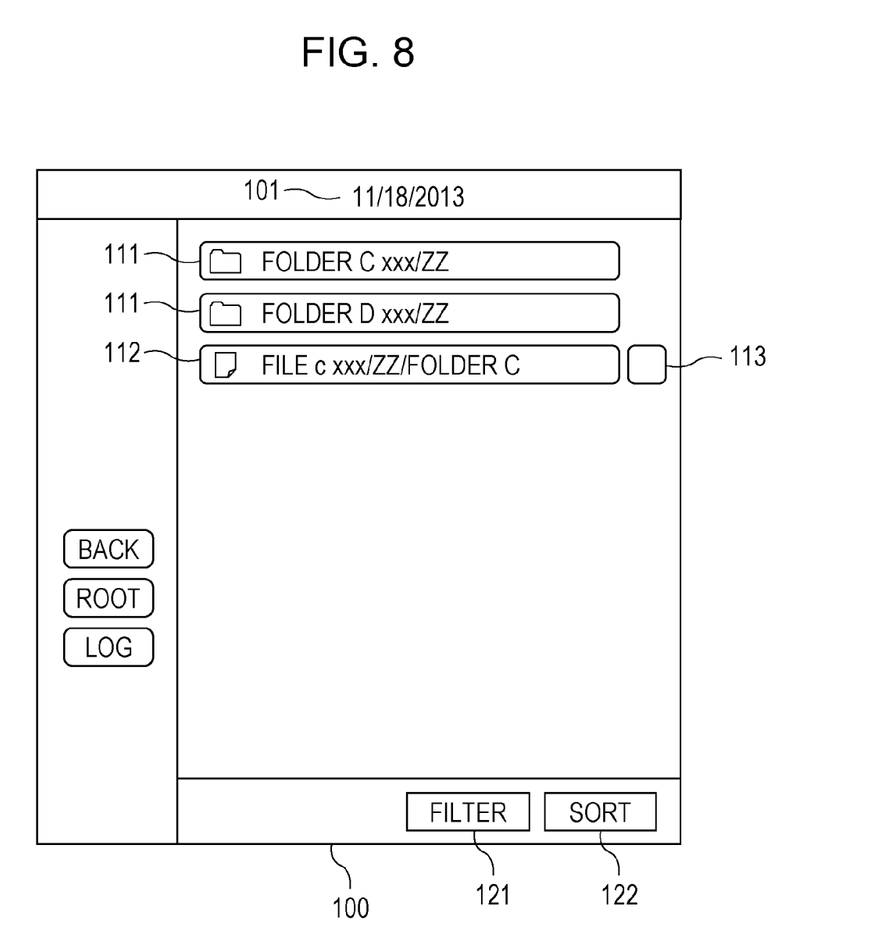
FIG. 8 is a diagram illustrating the display screen on which the log list obtained as a result of selection of a date button is displayed.

In a case where the date button 114 has been selected by a user, the log display unit 24 displays the log list corresponding to the selected date. FIG. 8 is a diagram illustrating the display screen 100 on which the log list obtained as a result of selection of the date button 114 is displayed. As illustrated in FIG. 8, the log list displayed in this example is a list of files and folders in the information log illustrated in FIG. 6, the date and time of access of the files or the date and time of browsing of the folders being Nov. 18, 2013. In a case where each button on the display screen 100 illustrated in FIG. 8 has been selected, a process is performed similarly to a case where the corresponding button in the log list illustrated in FIG. 7 is selected.

On the display screen 100 on which the log list is displayed as illustrated in FIG. 7 and FIG. 8, the buttons for performing a filter process and a sort process on the displayed log list may be arranged. Specifically, in a case where the filter button 121 has been selected by a user, character strings, such as "Files only", "Folders only", and "All", are displayed on the display screen 100 so as to be selectable. In a case where "Files only" has been selected, the log display unit 24 displays the log list obtained by hiding the folder selection button 111 and removing the blank row generated as a result of hiding the folder selection button 111. In a case where "Folders only" has been selected, the log display unit 24 displays the log list obtained by hiding the file selection button 112 and the file storage location selection button 113 and removing the blank row. Note that, in a case where "All" has been selected, the log display unit 24 displays the log list without hiding any of the folder selection button 111, the file selection button 112, and the file storage location selection button 113.

In a case where the sort button 122 has been selected by a user, character strings that indicate detailed sort conditions, such as "Date and time of access", "Number of times of access", and "Total browsing time", are displayed on the display screen 100 so as to be selectable. When any of the displayed character strings has been selected, the folder selection buttons 111 or the sets of the file selection buttons 112 and the file storage location selection buttons 113 displayed in the log list are sorted. Note that, in a case where the sort function is implemented, the log information recording unit 23 records the "number of times of access" that is the number of times each file has been accessed (or the number of times each folder has been browsed) and the "total access time" that is the total time each file has been accessed (or the total time each folder has been browsed by a user) in the information log, and the log display unit 24 performs sorting in accordance with a selected sort condition. Sort conditions are not limited to those described above, and the log display unit 24 may perform sorting in accordance with other conditions.

As described above, in the first exemplary embodiment, the log list is displayed on the display screen 100. When any one has been selected by a user from among storage locations and pieces of data displayed in the log list, the storage location data list that is a list of pieces of data stored in the selected storage location or the preview image 131 of the selected piece of data is displayed on the display screen 100.

Second Exemplary Embodiment

Next, the information processing system according to a second exemplary embodiment will be described. The second exemplary embodiment is different from the first exemplary embodiment in that a log entry regarding a piece of data or a storage location on which a copy operation or a move operation has been performed by a user is recorded in the information log, and the information log in which such a log entry has been recorded is displayed.

Note that the hardware configuration and the functional configuration of the information processing apparatus 1 according to the second exemplary embodiment are similar to the first exemplary embodiment. Hereinafter, the second exemplary embodiment will be described while differences from the first exemplary embodiment will be focused.

In the second exemplary embodiment, the log information recording unit 23 records log entries regarding at least either of pieces of data and storage locations on which a copy operation or a move operation has been performed by a user in the information log. Specifically, some or all of four types of log entries, that is, a log entry regarding a file on which a copy operation has been performed, a log entry regarding a file on which a move operation has been performed, a log entry regarding a folder on which a copy operation has been performed, and a log entry regarding a folder on which a move operation has been performed, may be recorded in the information log.

Figure 9:
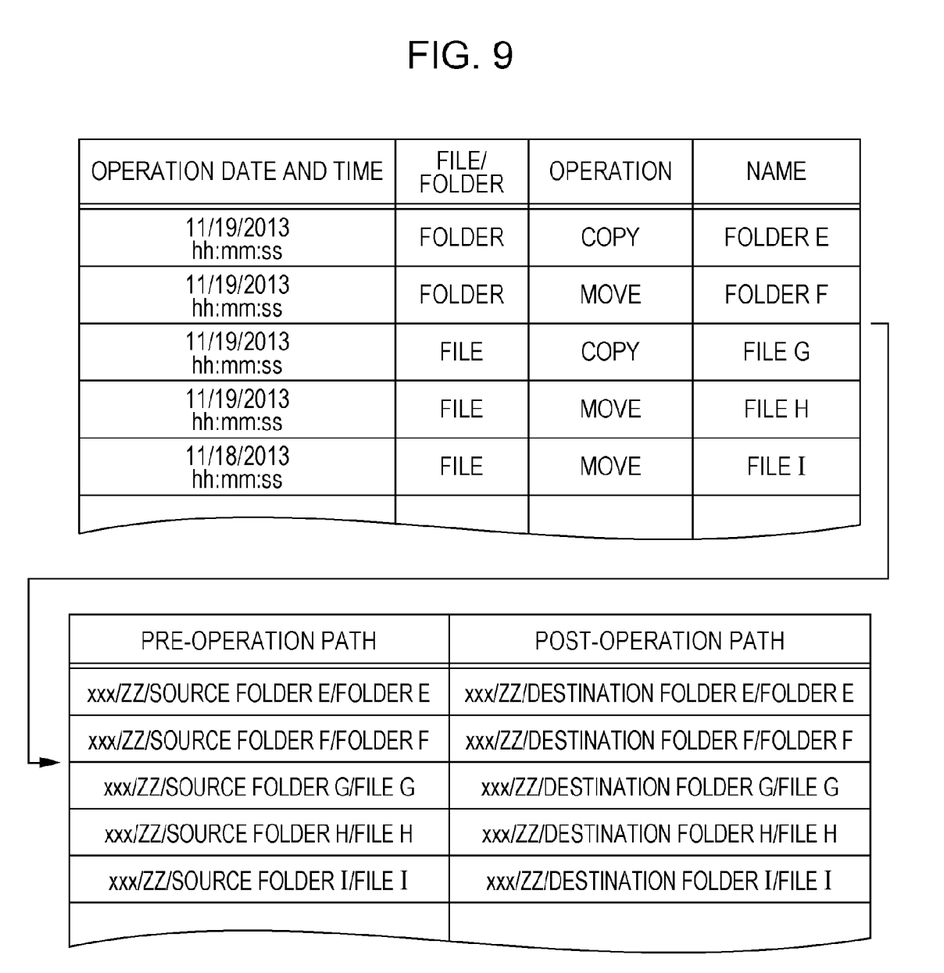
FIG. 9 is a diagram illustrating an information log according to a second exemplary embodiment.

FIG. 9 is a diagram illustrating the information log according to the second exemplary embodiment. As illustrated in FIG. 9, the information log according to the second exemplary embodiment includes information for identifying an operation performed on each file or folder, that is, information indicating whether a copy operation or a move operation has been performed, a pre-operation path that is the file path (or the folder path) of each file or folder before the copy or move operation is performed, and a post-operation path that is the file path (or the folder path) of each file or folder after the copy or move operation has been performed. In a case where a copy operation or a move operation has been performed by a user on a file, the log information recording unit 23 records information regarding the file path of the file immediately before the operation is performed and the file path of the file immediately after the operation has been performed in a new record of the information log as a file log entry, and stores the information log in the log information storage unit 31. In a case where a copy operation or a move operation has been performed by a user on a folder, the log information recording unit 23 records information regarding the folder path of the folder immediately before the operation is performed and the folder path of the folder immediately after the operation has been performed in a new record of the information log as a folder log entry, and stores the information log in the log information storage unit 31.

Figure 10:
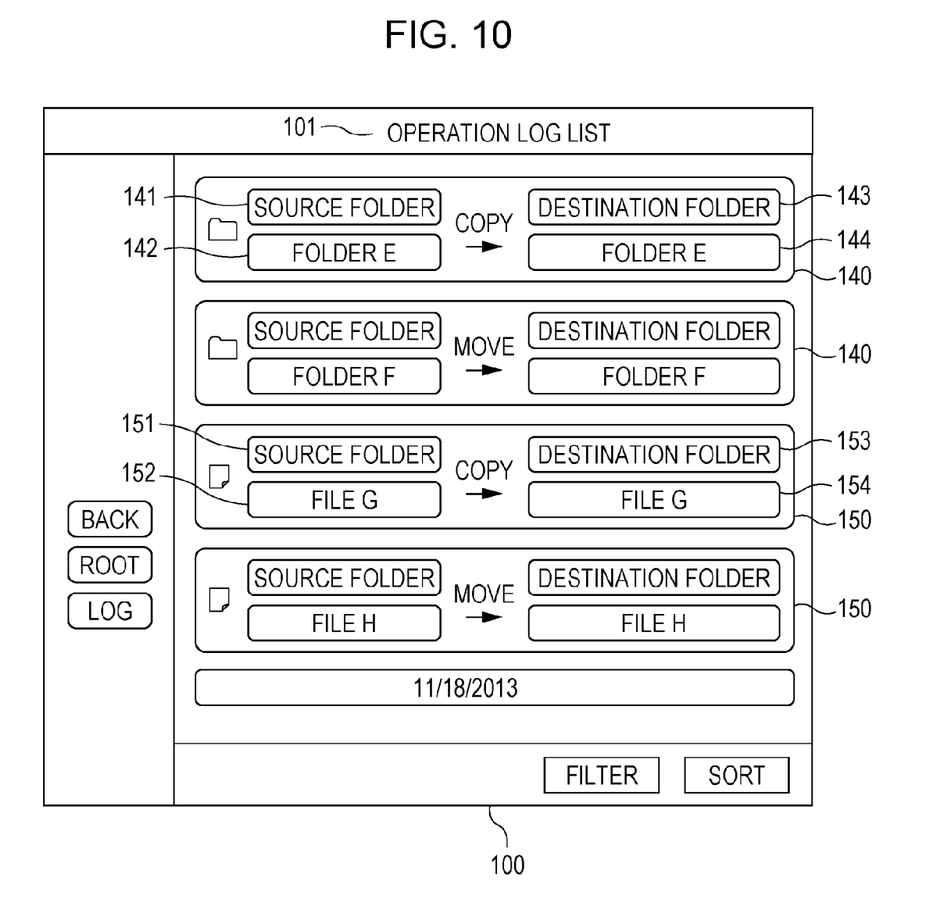
FIG. 10 is a diagram illustrating the display screen on which the log list according to the second exemplary embodiment is displayed.

The log display unit 24 displays the log list that is a list of log entries recorded in the information log. FIG. 10 is a diagram illustrating the display screen 100 on which the log list according to the second exemplary embodiment is displayed. As illustrated in FIG. 10, on the display screen 100 in this example, a folder operation log field 140 and a file operation log field 150 are displayed. Note that the log list according to the second exemplary embodiment will also be referred to as an operation log list hereinafter.

In a case where a log entry regarding a folder has been recorded in the information log, the log display unit 24 displays the folder operation log field 140 corresponding to the folder. In the folder operation log field 140, a pre-operation folder storage location button 141, a pre-operation folder button 142, a post-operation folder storage location button 143, and a post-operation folder button 144 are arranged so as to be selectable.

In a case where a log entry regarding a file has been recorded in the information log, the log display unit 24 displays the file operation log field 150 corresponding to the file. In the file operation log field 150, a pre-operation file storage location button 151, a pre-operation file button 152, a post-operation file storage location button 153, and a post-operation file button 154 are arranged so as to be selectable, and the detail of the operation performed by a user and recorded in the information log is displayed. Note that, in each of the folder operation log field 140 and the file operation log field 150, information recorded in the information log, such as the date and time of operation and the detail of operation, for example, may be displayed.

Note that, on the display screen 100 on which the log list according to the second exemplary embodiment is displayed, the date button 114, the filter button 121, and the sort button 122 may be displayed, and the functions corresponding to the buttons may be provided similarly to the first exemplary embodiment.

Here, the selection unit 21 selects, for at least either of pieces of data and storage locations displayed in the log list, any of a storage location before a copy operation is performed, a storage location after a copy operation or a move operation has been performed, a storage location of a piece of data before a copy operation or a move operation is performed, and a storage location of a piece of data after a copy operation or a move operation has been performed. The storage location data display unit 20 displays the storage location data list that is a list of pieces of data stored in the selected storage location. Specifically, in a case where any of the pre-operation folder button 142, the post-operation folder button 144, the pre-operation file storage location button 151, and the post-operation file storage location button 153 has been selected by a user, the storage location data list that corresponds to the selected folder is displayed on the display screen 100. Examples of cases where the storage location data list is displayed will be described below:

in a case where the pre-operation folder button 142 corresponding to "Folder E" has been selected, the storage location data list that lists pieces of data stored in the folder indicated by a folder path "xxx/ZZ/Source Folder E/Folder E" is displayed;

in a case where the post-operation folder button 144 corresponding to "Folder E" has been selected, the storage location data list that lists pieces of data stored in the folder indicated by a folder path "xxx/ZZ/Destination Folder E/Folder E" is displayed;

in a case where the pre-operation file storage location button 151 corresponding to "Source Folder G" has been selected, the storage location data list that lists pieces of data stored in the folder indicated by a folder path "xxx/ZZ/Source Folder G" is displayed; and in a case where the post-operation file storage location button 153 corresponding to "Destination Folder G" has been selected, the storage location data list that lists pieces of data stored in the folder indicated by a folder path "xxx/ZZ/Destination Folder G" is displayed.

In a case where the pre-operation folder storage location button 141 or the post-operation folder storage location button 143 has been selected, storage location data corresponding to the selected folder is displayed. Note that, in a case where any of the pre-operation folder storage location button 141, the post-operation folder storage location button 143, the pre-operation file storage location button 151, and the post-operation file storage location button 153 has been selected, the log display unit 24 may identify the folder path of the folder in which folders and files are stored by extracting a partial character string (for example, a character string from the first character to the last "/") from the character string that represents the folder path (or the file path) in the information log.

The selection unit 21 selects any of a piece of data before a copy operation is performed and a piece of data after a copy operation or a move operation has been performed from among the pieces of data displayed in the log list, and the data content display unit 22 displays an image that represents the content of the selected piece of data. Specifically, in a case where any of the pre-operation file button 152 and the post-operation file button 154 has been selected by a user, the preview image 131 that represents the content of the selected file is displayed on the display screen 100. Examples of cases where the preview image 131 is displayed will be described below:

in a case where the pre-operation file button 152 corresponding to "File G" has been selected, the preview image 131 of the file indicated by a file path "xxx/ZZ/Source Folder G/File G" is displayed; and in a case where the post-operation file button 154 corresponding to "File G" has been selected, the preview image 131 of the file indicated by a file path "xxx/ZZ/Destination Folder G/File G" is displayed.

As descried above, in the second exemplary embodiment, the log list of pieces of data or storage locations on which a copy operation or a move operation has been performed by a user is displayed on the display screen 100. When any of the storage locations and the pieces of data displayed in the log list has been selected by a user, the storage location data list that is a list of pieces of data stored in the selected storage location or the preview image 131 of the selected piece of data is displayed on the display screen 100. However, it is highly probable that a piece of data or a storage location before a move operation is performed (specifically, a file or a folder, the file path or the folder path of which has been recorded in the information log as a pre-operation path) is no longer present because the piece of data or the storage location has already been moved. Furthermore, there may be a case where a piece of data or a storage location other than those described above is deleted at a later time and is no longer present. As described above, in a case where a piece of data or a storage location selected by a user is not present, control is performed so as not to display the preview image 131 or the storage location data list. In this case, the log display unit 24 may display a text indicating that the piece of data or the storage location is no longer present on the display screen 100 or may display a button corresponding to the piece of data or the storage location that is no longer present so as to be disabled (in a grayed-out state) in the log list displayed on the display screen 100.

While exemplary embodiments of the present invention have been described, specific configurations described in the exemplary embodiments are merely illustrative and are not restrictive. Those skilled in the art may modify the disclosed exemplary embodiments as appropriate, and it is understood that such modifications are also included in the technical scope of the present invention disclosed herein.

Modifications

Examples of modifications to the exemplary embodiments of the present invention will be described below.

(1) In the second exemplary embodiment, the case has been described where a log entry regarding a piece of data or a storage location on which a copy operation or a move operation has been performed by a user is recorded in the information log, and the operation log list based on the information log is displayed. Operations that trigger recording in the information log are not limited to a copy operation and a move operation. That is, the log information recording unit 23 may record log entries regarding at least either of pieces of data and storage locations on which a predetermined operation has been performed by a user in the information log.

More specifically, the log information recording unit 23 records a log entry regarding a file or a folder on which a predetermine operation (for example, a transmission operation, a print operation, or the like) has been performed in the information log. The log display unit 24 displays the log list that is a list of log entries thus recorded in the information log, and the selection unit 21 selects at least either of a piece of data and a storage location displayed in the log list. The storage location data display unit 20 displays the storage location data list that is a list of pieces of data stored in the storage location selected by the selection unit 21 on the display screen 100, and the data content display unit 22 displays an image that represents the content of the piece of data selected by the selection unit 21. In this way, log entries regarding a piece of data and a storage location on which a predetermined operation has been performed may be recorded and the log entries are displayed in the log list on the display screen 100.

(2) In the first exemplary embodiment, the case has been described where the access log list that is a list of log entries regarding pieces of data selected by a user as targets of an information process or storage locations browsed by a user is displayed. In the second exemplary embodiment, the case has been described where the operation log list that is a list of log entries regarding pieces of data and storage locations on which a copy operation or a move operation has been performed by a user is displayed. The log information recording unit 23 may record two types of information logs, that is, the information log corresponding to the first exemplary embodiment and the information log corresponding to the second exemplary embodiment, and the log display unit 24 may display two types of log lists that correspond to the information logs, that is, the access log list and the operation log list, on the display screen 100. The log display unit 24 may switch the content to be displayed between the access log list and the operation log list in accordance with a selection operation performed by a user.

Figure 11:
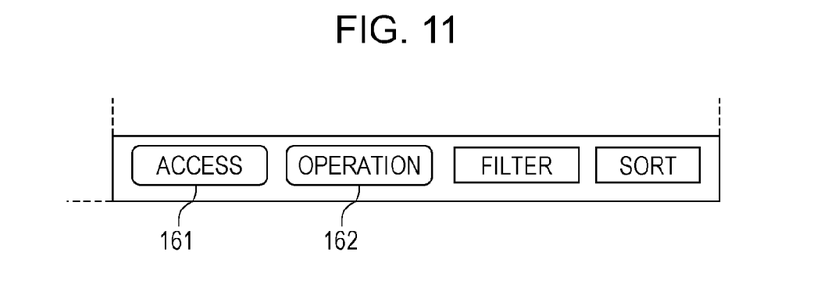
FIG. 11 is a diagram illustrating part of the display screen on which the log list is displayed.

FIG. 11 is a diagram illustrating part of the display screen 100 on which the log list is displayed. As illustrated in FIG. 11, the log display unit 24 displays, on the display screen 100 on which any of the access log list and the operation log list is displayed, an access log list button 161 and an operation log list button 162 so as to be selectable. Here, in a case where the access log list button 161 has been selected by a user, the log display unit 24 displays the access log list on the display screen 100, and, in a case where the operation log list button 162 has been selected by a user, the log display unit 24 displays the operation log list on the display screen 100. As described above, the type of log list to be displayed may be switched in accordance with an operation performed by a user.

(3) The functional configuration described in the exemplary embodiments is not limited to a functional configuration implemented as the hardware of the information processing apparatus 1 and may be implemented as an external device or apparatus. For example, the log information recording unit 23, the data storage unit 30, and the log information storage unit 31 may be included in a server apparatus that is connected to the information processing apparatus 1 via a bus or a network.

More specifically, the information processing apparatus 1 transmits information regarding a piece of data selected by a user as a target of an information process or information regarding a storage location browsed by a user to the server apparatus via the communication unit 13, and the server apparatus performs recording in the information log stored in the log information storage unit 31 on the basis of the transmitted information. The log display unit 24 obtains the information log stored in the server apparatus by receiving the information log via the communication unit 13 and displays the display screen 100 on which the log list is displayed. As described above, the functional configuration described in the exemplary embodiments is not limited to a functional configuration implemented as a single apparatus alone but may be implemented as a system that includes plural apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a microprocessor configured to:
record log entries regarding pieces of a file in an information log; and
display a file selection image associated with each of the selected files recorded in an information log and a storage selection image, which includes a list of storage locations which store the file when the file is selected,
record log entries regarding at least either of pieces of data and storage locations on which a copy operation or a move operation has been performed by a user in the information log,
select, from among the pieces of a file corresponding to the log entries displayed in the information log, any of a piece of the file before the copy operation is performed and a piece of the file after the copy operation or the move operation has been performed, and
display an image representing content of the pieces of the file selected by the microprocessor.

2. The information processing apparatus according to claim 1, wherein
the microprocessor is further configured to:
record log entries regarding storage locations browsed by a user in the information log, and
select any of the storage locations corresponding to the log entries displayed in the information log.

3. The information processing apparatus according to claim 2, wherein
the microprocessor is further configured to record a log entry regarding a storage location for which a storage location file list has been displayed for a predetermined time period in the information log.

4. The information processing apparatus according to claim 1, wherein the microprocessor is further configured to:
record log entries regarding at least either of pieces of file and storage locations on which a predetermined operation has been performed by a user in the information log, and
select any of the at least either of pieces of a file and storage locations corresponding to log entries displayed in the information log.

5. The information processing apparatus according to claim 2, wherein the microprocessor is further configured to:

record log entries regarding at least either of pieces of a file and storage locations on which a predetermined operation has been performed by a user in the information log, and select any of the at least either of pieces of file and storage locations corresponding to log entries displayed in the information log.

6. The information processing apparatus according to claim 3, wherein the microprocessor is further configured to:

record log entries regarding at least either of pieces of a file and storage locations on which a predetermined operation has been performed by a user in the information log, and select any of the at least either of pieces of file and storage locations corresponding to log entries displayed in the information log.

7. The information processing apparatus according to claim 1, wherein the microprocessor is further configured to select, for the at least either of pieces of a file and storage locations corresponding to the storage selection image, any of a storage location among the storage locations before a copy operation is performed, a storage location among the storage locations after the copy operation or the move operation has been performed, a storage location of a piece of the file among the pieces of the file before the copy operation or the move operation is performed, and a storage location of a piece of the file among the pieces of the file after the copy operation or the move operation has been performed.

8. An information processing system comprising:

a server apparatus comprising a first microprocessor configured to:
record log entries regarding pieces of a file in an information log;

an information processing apparatus comprising a second microprocessor configured to:
display a file selection image associated with each of the selected files recorded in an information log and a storage selection image, which includes a list of storage locations which store the file when the file is selected, record log entries regarding at least either of pieces of data and storage locations on which a copy operation or a move operation has been performed by a user in the information log, select, from among the pieces of a file corresponding to the log entries displayed in the information log, any of a piece of the file before the copy operation is performed and a piece of the file after the copy operation or the move operation has been performed, and display an image representing content of the pieces of the file selected by the microprocessor.

9. An information processing method comprising:

recording log entries regarding pieces of a file in an information log; and displaying a file selection image associated with each of the selected files recorded in an information log and a storage selection image, which includes a list of storage locations which store the file when the file is selected, record log entries regarding at least either of pieces of data and storage locations on which a copy operation or a move operation has been performed by a user in the information log, select, from among the pieces of a file corresponding to the log entries displayed in the information log, any of a piece of the file before the copy operation is performed and a piece of the file after the copy operation or the move operation has been performed, and display an image representing content of the pieces of the file selected by the microprocessor.

10. A non-transitory computer readable medium storing a program causing a computer to execute a process for information processing, the process comprising:

recording log entries regarding pieces of a file in an information log;

displaying a file selection image associated with each of the selected files recorded in an information log and a storage selection image, which includes a list of storage locations which store the file when the file is selected, record log entries regarding at least either of pieces of data and storage locations on which a copy operation or a move operation has been performed by a user in the information log, select, from among the pieces of a file corresponding to the log entries displayed in the information log, any of a piece of the file before the copy operation is performed and a piece of the file after the cop operation or the move operation has been performed, and display an image representing content of the pieces of the file selected by the microprocessor.

* * * * *